(12) United States Patent
Chen (10) Patent No.: US 8,147,358 B2
(45) Date of Patent: Apr. 3, 2012

(54) ADJUSTABLE NET POST ASSEMBLY USED IN BALL GAMES

(76) Inventor: Benjamin Chen, Taichung (TW)

( * ) Notice: Subject to any disclaimer, the term of this patent is extended or adjusted under 35 U.S.C. 154(b) by 227 days.

(21) Appl. No.: 12/753,883

(22) Filed: Apr. 4, 2010

(65) Prior Publication Data

US 2011/0244995 A1  Oct. 6, 2011

(51) Int. Cl.
*A63B 61/02* (2006.01)
(52) U.S. Cl. ...................................................... 473/492
(58) Field of Classification Search ............... 403/109.1, 403/109.2, 109.3, 109.8; 473/492, 494, 473
See application file for complete search history.

(56) References Cited

U.S. PATENT DOCUMENTS

| | | | | |
|---|---|---|---|---|
| 4,169,687 | A * | 10/1979 | Schull | 403/109.3 |
| 5,924,658 | A * | 7/1999 | Shiery et al. | 248/125.8 |
| 6,409,412 | B1 * | 6/2002 | Huang | 403/109.3 |
| 6,494,636 | B1 * | 12/2002 | Mozena | 403/109.2 |
| 6,725,971 | B1 * | 4/2004 | Bair | 182/186.6 |
| 7,311,061 | B1 * | 12/2007 | Wiese | 116/173 |
| 7,654,371 | B1 * | 2/2010 | Metz et al. | 188/300 |
| 8,057,329 | B2 * | 11/2011 | Cusimano | 473/492 |
| 2005/0271463 | A1 * | 12/2005 | Mann | 403/109.1 |
| 2011/0244995 | A1 * | 10/2011 | Chen | 473/492 |

\* cited by examiner

*Primary Examiner* — Raleigh W. Chiu (57) ABSTRACT

An adjustable net post assembly used in ball games comprises: an inner sleeve, an outer sleeve, a spring, an outer pipe and an inner pipe. By rotating the outer sleeve, the protrusion of the outer sleeve is moved to the first positioning portion or the second positioning portion the slot of the inner sleeve, so that the positioning protrusion of the positioning member will be disengaged from or engaged in the positioning hole of the inner pipe, which allows the inner pipe to be adjusted by being retracted or extended with respect to the outer pipe.

7 Claims, 10 Drawing Sheets

ADJUSTABLE NET POST ASSEMBLY USED IN BALL GAMES

BACKGROUND OF THE INVENTION

1. Field of the Invention

The present invention relates to a net post assembly used in ball games, and more particularly to an adjustable net post assembly used in ball games.

2. Description of the Prior Art

Figure 1:
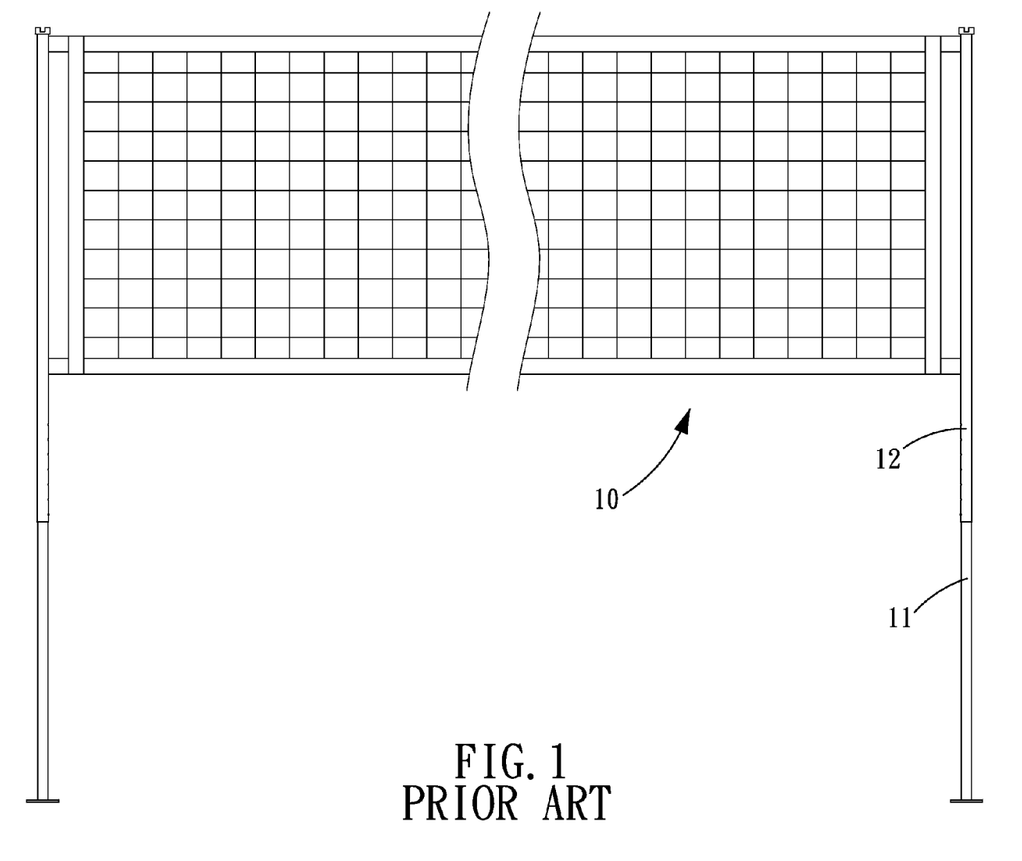
FIG. 1 is an illustrative view of a conventional net post assembly.
Figure 2:
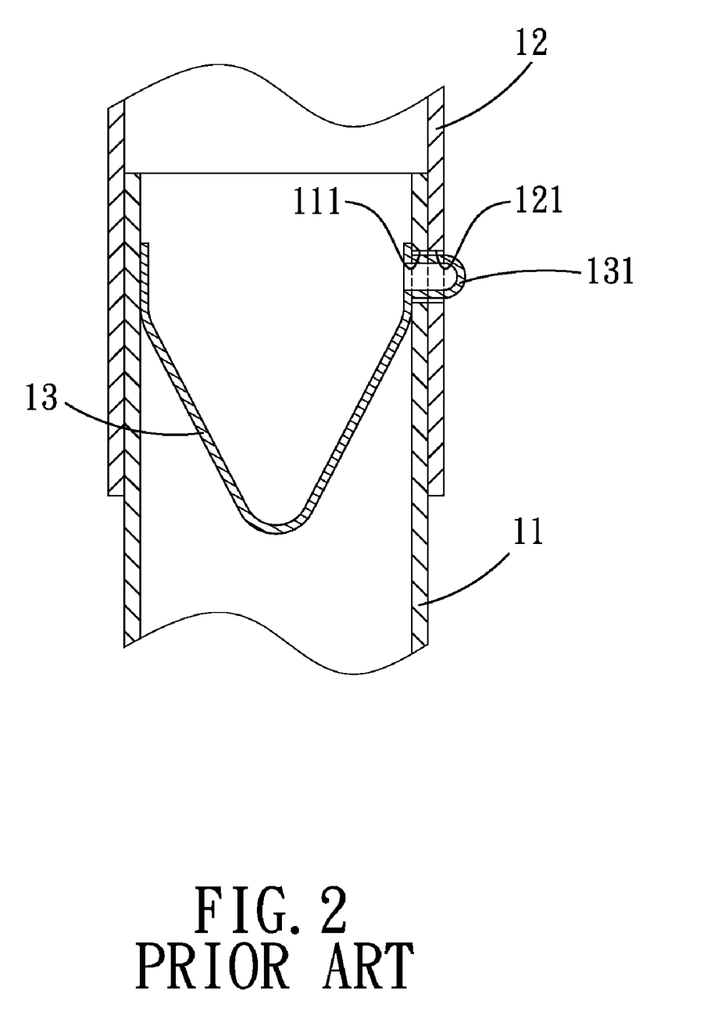
FIG. 2 is a cross sectional view of the conventional net post assembly.
Figure 3:
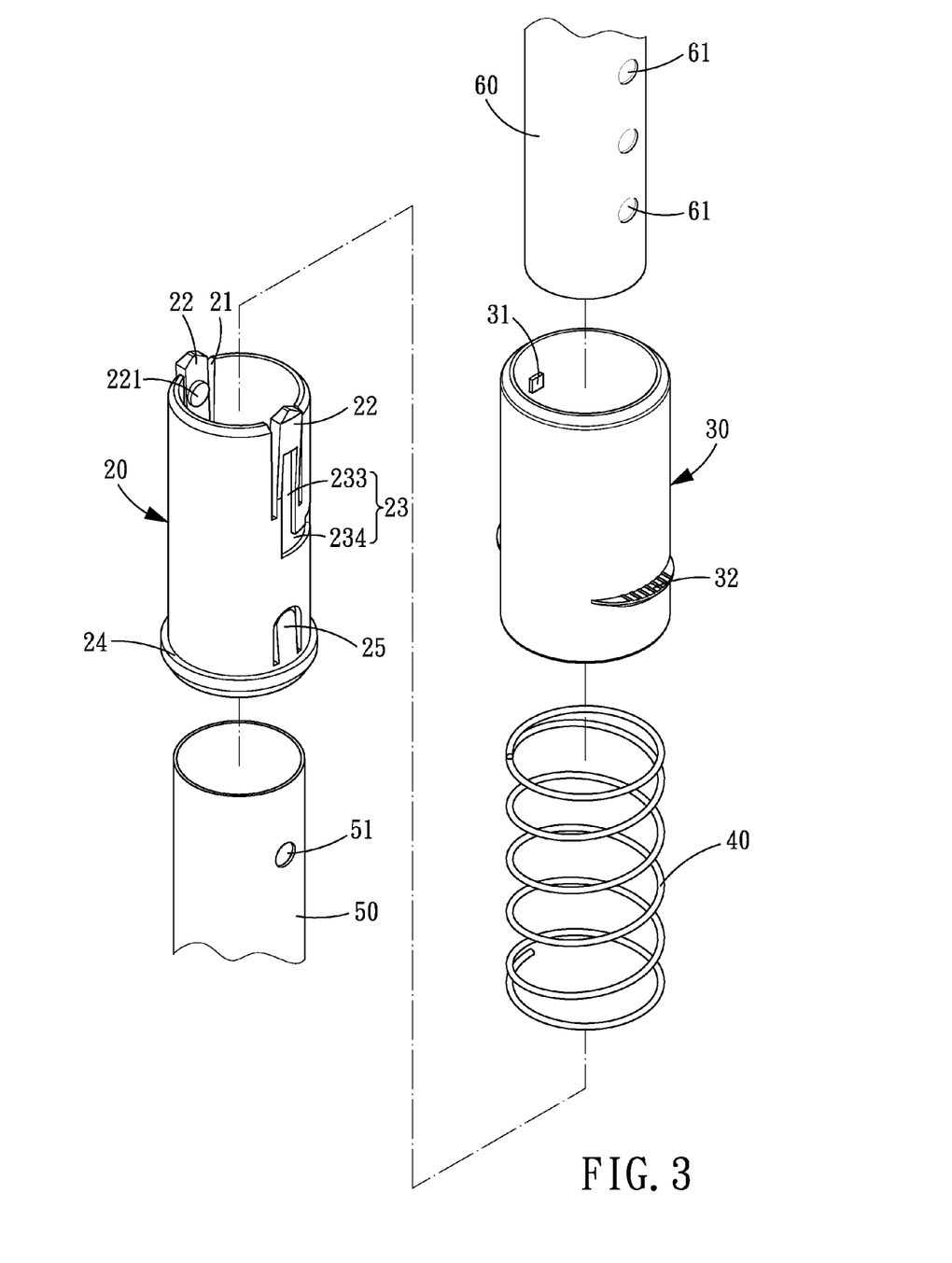
FIG. 3 is an exploded view of a net post assembly used in ball games in accordance with a first preferred embodiment of the present invention.
Figure 4:
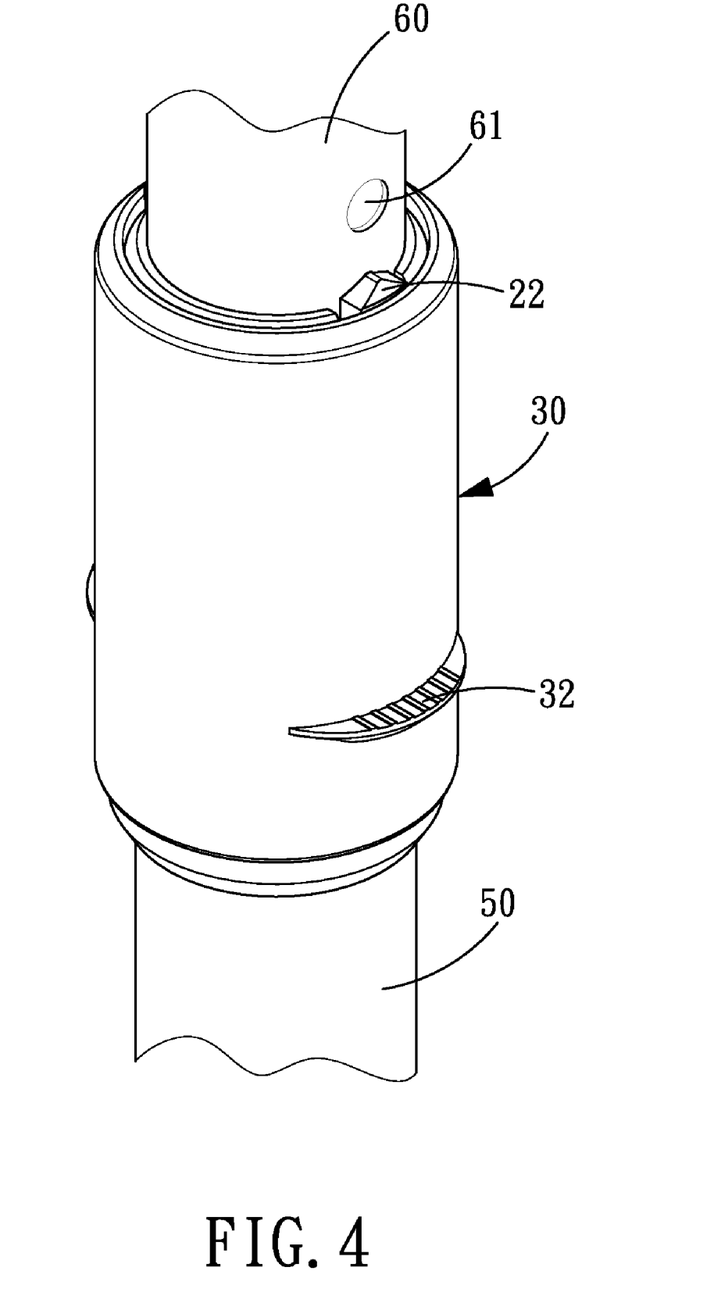
FIG. 4 is an assembly view of the net post assembly used in ball games in accordance with the first preferred embodiment of the present invention.

Referring to FIGS. 1 and 2, a net frame 10 essentially comprises a plurality of inner pipes 11, outer pipes 12 which can be adjusted to different positions according to actual needs, and a plurality of positioning members 13 capable of fixing the inner and outer pipes 11, 12 at desired positions. By pulling the positioning protrusion 131 of the respective positioning members 13 out of the positioning holes 121 of the outer pipes 12, the outer pipes 12 can be extended or retracted to adjust the positions of the outer pipes 12 with respect to the inner pipes 11. However, this conventional net frame has the following disadvantages that need to be improved:

For easy explanation, only one set of inner and outer pipes 11, 12 with one positioning member 13 is illustrated, without any positioning structures, the positioning member 13 is disposed in the inner pipe 11 in such a manner that the positioning protrusion 131 of the positioning member 13 is engaged in the positioning holes 111, 121 of the inner and outer pipes 11, 12 to make the positioning member 13 stay in the inner pipe 11. When the inner and outer pipes 11, 12 are pulled away or pushed towards each other, and once the positioning protrusion 131 is retracted into the inner pipe 11, the positioning member 13 will slide within in the inner pipe 11 with the positioning protrusion 131 abutting against the inner surface of the inner pipe 11. Eventually, the positioning member 13 will lose its original function, and as a result, the inner and outer pipes 11, 12 cannot be positioned in place after adjustment.

The present invention has arisen to mitigate and/or obviate the afore-described disadvantages.

SUMMARY OF THE INVENTION

The primary object of the present invention is to provide an adjustable net post assembly used in ball games, which is capable of improving the stability when the net post assembly is being adjusted.

To achieve the above object, an adjustable net post assembly used in ball games comprises: an inner sleeve, an outer sleeve, a spring, an outer pipe and an inner pipe. The inner sleeve is provided with at least one gap at an upper half thereof, and an elastic positioning member extends from a bottom of the gap and is provided with a positioning protrusion on an inner surface thereof, the upper half of the inner sleeve is further formed with a slot which includes a first positioning portion at one end thereof and a second positioning portion at another end corresponding to the positioning member. The outer sleeve is provided with at least one protrusion on an inner surface thereof and is rotatably mounted on the inner sleeve in such a manner that the protrusion is engaged in the slot of the inner sleeve. The spring is biased between the inner sleeve and the outer sleeve in such a manner that the protrusion of the outer sleeve is engaged in the first positioning portion or the second positioning portion the slot of the inner sleeve. The outer pipe has an end fixed to a lower half of the inner sleeve. The inner pipe is axially provided with a plurality of positioning holes and adjustably disposed in the inner sleeve and the outer pipe in such a manner that the positioning protrusion of the positioning member is selectively engaged in the positioning holes. When the protrusion of the outer sleeve is moved to the first positioning portion or the second positioning portion the slot of the inner sleeve by rotating the outer sleeve, the positioning protrusion of the positioning member will be disengaged from or engaged in the positioning hole of the inner pipe, so as to allow the inner pipe to be adjusted by being retracted or extended with respect to the outer pipe.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 3-6, an adjustable net post assembly used in ball games in accordance with a preferred embodiment of the present invention comprises: an inner sleeve 20, an outer sleeve 30, a spring 40, an outer pipe 50 and an inner pipe 60.

The inner sleeve 20 is a hollow circular structure an upper half of which is provided with two opposite gaps 21, and extending from the bottom of each gap 21 is an elastic positioning member 22 which is provided with a positioning protrusion 221 on an inner surface thereof. The upper half of the inner sleeve 20 is further formed with a slot 23 which includes a first positioning portion 231 at one end thereof and a second positioning portion 232 at the other end corresponding to the positioning member 22. In this embodiment, the slot 23 is a L-shaped structure including a longitudinal section 233 and a transverse section 234, the first positioning portion 231 is located in the end of the transverse section 234 and the second positioning portion 232 is located at the top end of the longitudinal section 233. The lower half of the inner sleeve 20 is formed around its outer periphery with an annular flange 24 and two opposite elastic positioning ribs 25 beside the annular flange 24, and each positioning ribs 25 is provided on its inner surface with a locking protrusion 251.

The outer sleeve 30 is a hollow circular structure an upper half of which is provided with two opposite protrusions 31 on the inner surface thereof, and a lower half of the outer sleeve 30 is provided on its outer surface with two opposite arc-shaped outward protruding gripping portions 32. Furthermore, on an inner surface of the outer sleeve 30 is formed an annular shoulder portion 33, and the outer sleeve 30 is rotatably mounted on the inner sleeve 20 in such a manner that the protrusions 31 are engaged in the slot 23 of the inner sleeve 20.

The spring 40 is biased between the annular flange 24 of the inner sleeve 20 and the annular shoulder portion 33 of the outer sleeve 30 in such a manner that the protrusions 31 are engaged in the first positioning portion 231 or the second positioning portion 232 the slot 23 of the inner sleeve 20.

The outer pipe 50 is a hollow pipe is provided at its upper end with two opposite locking holes 51 for engaging with the two locking protrusions 251 of the elastic positioning ribs 25 of the inner sleeve 20, so that the outer pipe 50 and the inner sleeve 20 are positioned and retained to each other in such a manner that one end of the outer pipe 50 is fixed to the lower half of the inner sleeve 20.

The inner pipe 60 is a hollow pipe with an inner diameter smaller than the outer pipe 50 and the inner sleeve 20 and axially provided with a plurality of positioning holes 61. The inner pipe 60 is adjustably disposed in the inner sleeve 20 and the outer pipe 50 in such a manner that the positioning protrusions 221 of the positioning member 22 are selectively engaged in the positioning holes 61.

When the protrusions 31 of the outer sleeve 30 are moved to the first positioning portion 231 or the second positioning portion 232 the slot 23 of the inner sleeve 20 by rotating the outer sleeve 30, the positioning protrusions 221 of the positioning member 22 will be disengaged from or engaged in the positioning holes 61 of the inner pipe 60, which allows the inner pipe 60 to be adjusted by being retracted or extended with respect to the outer pipe 50.

For a better understanding of the present invention, its operation and function, reference should be made to FIGS. 5-9.

Figure 5:
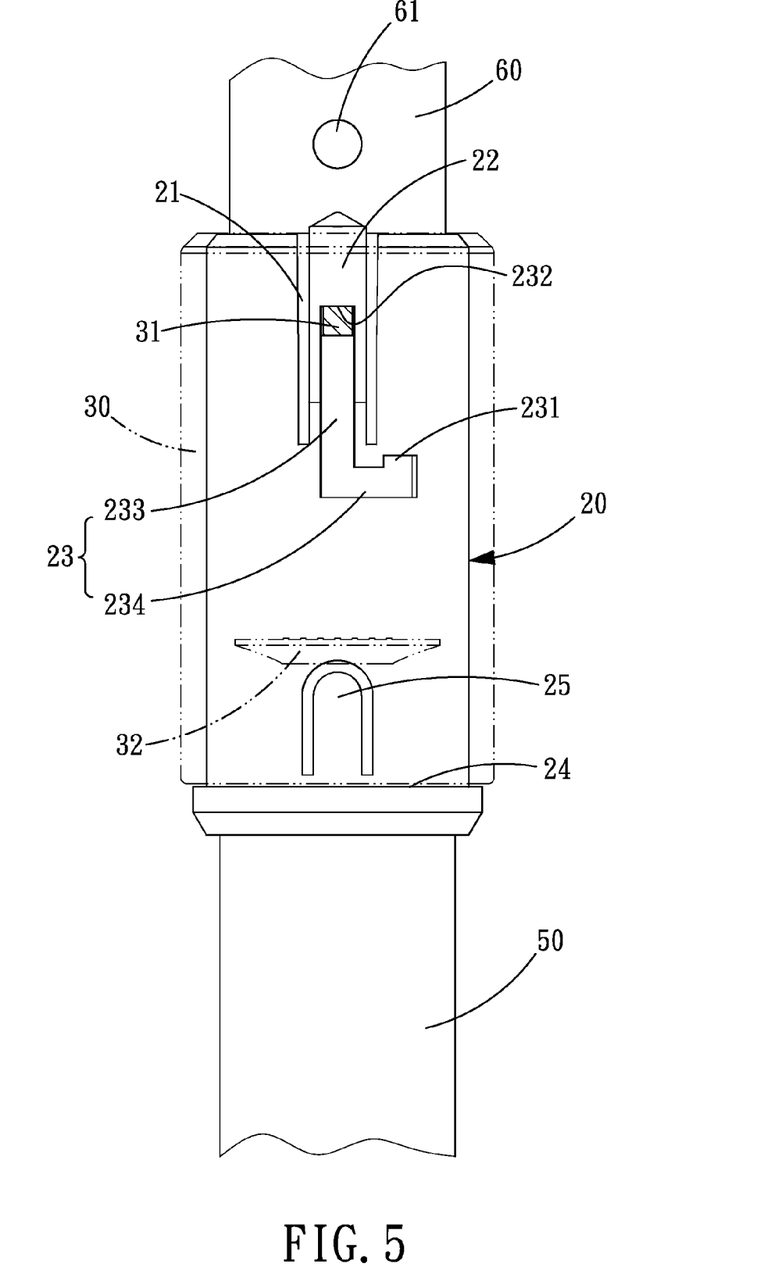
FIG. 5 is a side view of the net post assembly used in ball games in accordance with the first preferred embodiment of the present invention.
Figure 6:
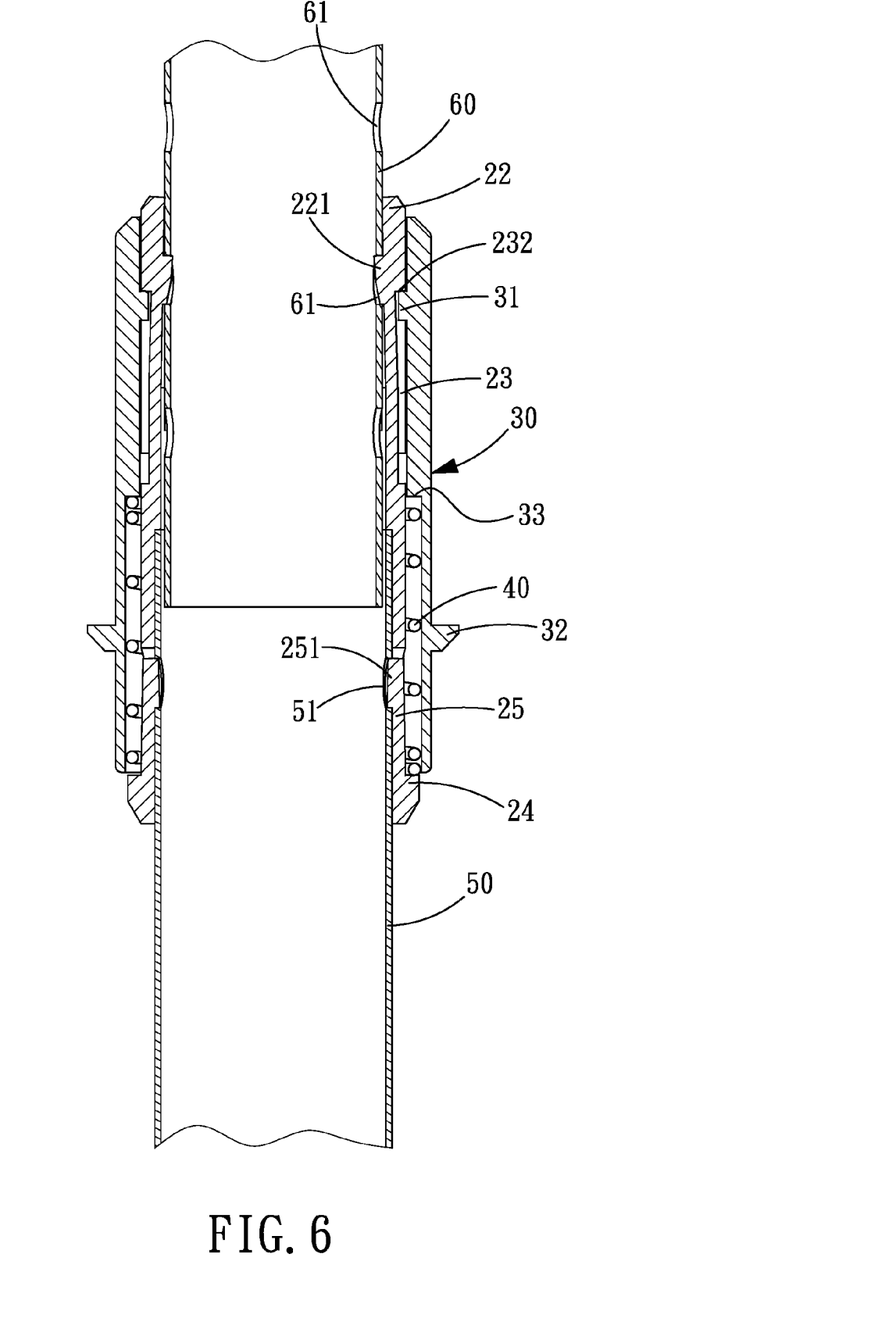
FIG. 6 is a cross sectional view of the net post assembly used in ball games in accordance with the first preferred embodiment of the present invention.

Referring first to FIGS. 5 and 6, before the inner and outer pipes 50, 60 are adjusted, the protrusions 31 of the outer sleeve 30 are located in the second positioning portion 232 of the slot 23 of the inner sleeve 20 in such a manner that the positioning members 22 of the inner sleeve 20 are pushed against by the protrusions 31 of the outer sleeve 30, and the positioning protrusions 221 of the positioning members 22 are engaged in the positioning holes 61. Hence, at this moment, the inner pipe 60 is locked in position and cannot be adjusted.

Figure 7:
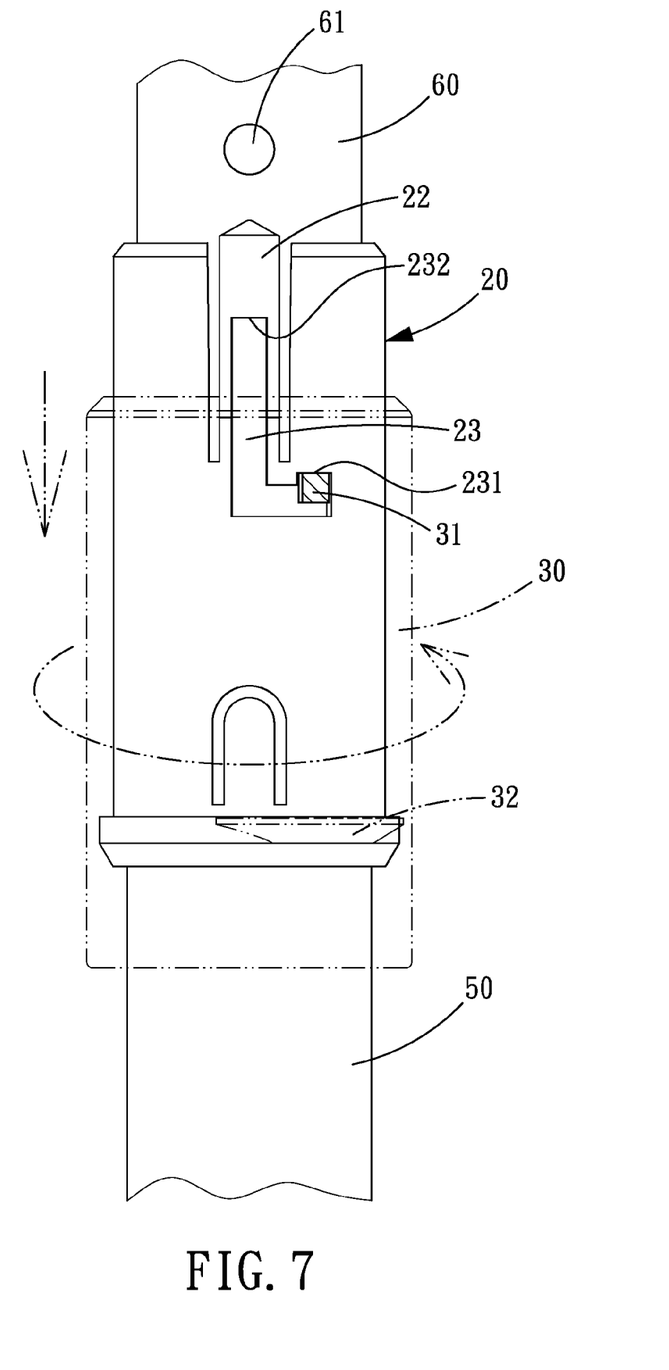
FIG. 7 is an operational view of the net post assembly used in ball games in accordance with the first preferred embodiment of the present invention.
Figure 8:
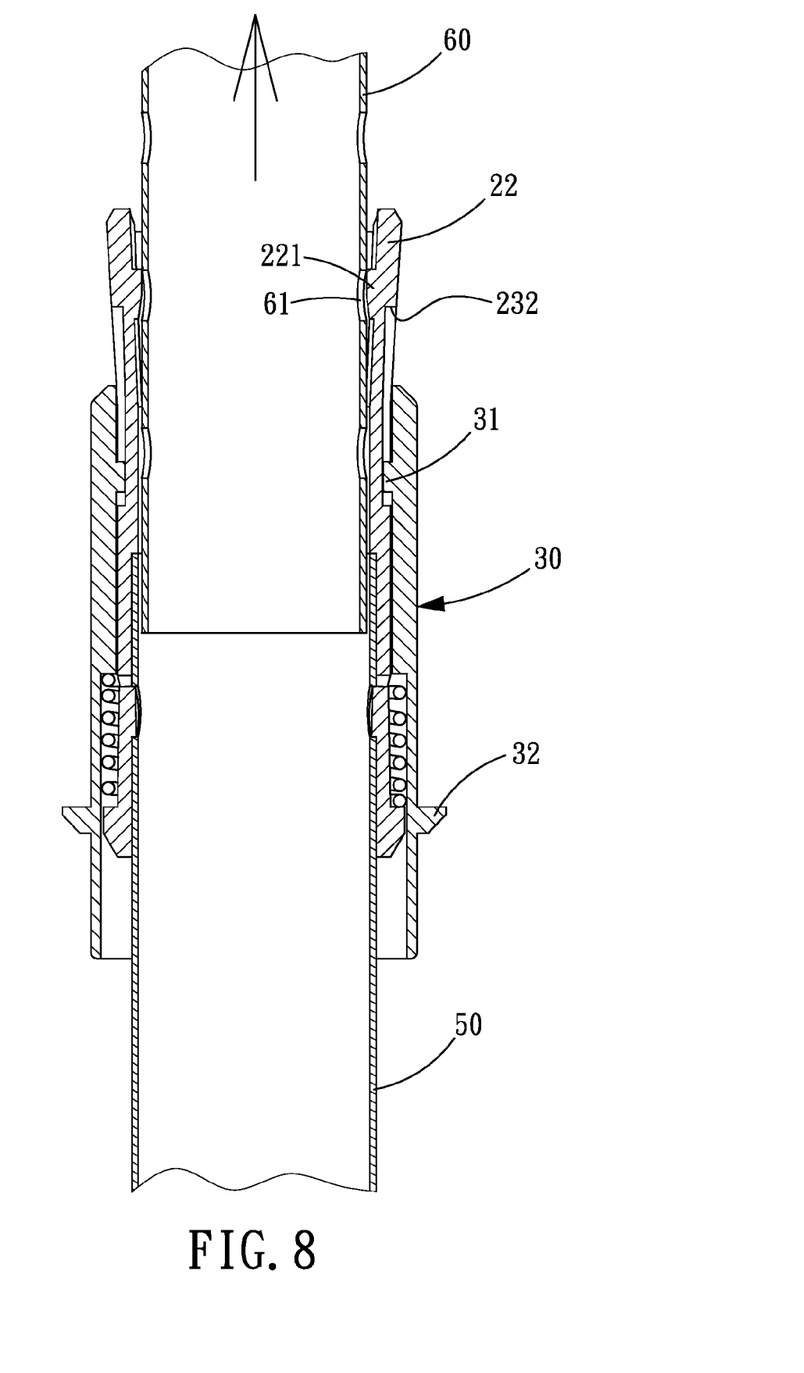
FIG. 8 is an operational view of the net post assembly used in ball games in accordance with the first preferred embodiment of the present invention, wherein the outer sleeve has been adjusted.

Referring then to FIGS. 7 and 8, to adjust the inner and outer pipes 50, 60, the user can hold the gripping portion 32 of the outer sleeve 30, pull it downward and then rotate it an angle, as indicated by the arrows shown in FIG. 7, making the protrusions 31 of the outer sleeve 30 move to the first positioning portion 231 from the second positioning portion 232 the slot 23 of the inner sleeve 20. At this moment, the positioning members 22 of the inner sleeve 20 are not pushed against by the protrusions 31 of the outer sleeve 30 any longer, and the elasticity of the positioning members 22 make the positioning protrusions 221 disengage from the positioning holes 61, so that the inner pipe 60 are allowed to be adjusted by being retracted or extended with respect to the outer pipe 50.

Figure 9:
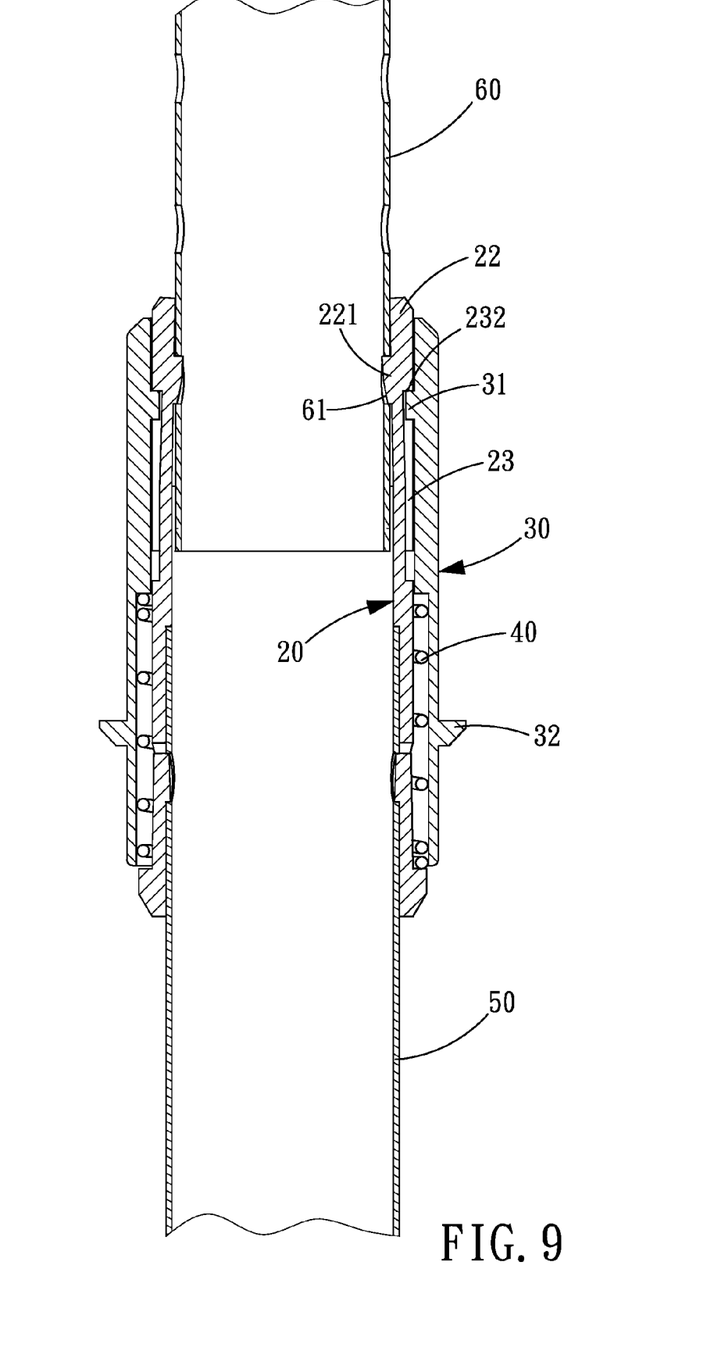
FIG. 9 is a cross sectional view showing the after-adjustment state of the net post assembly in accordance with the first preferred embodiment of the present invention.

Referring finally to FIGS. 7 and 9, after the inner and outer pipes 50, 60 are adjusted to a desired position, the user can hold the gripping portion 32 of the outer sleeve 30, reversely rotating it an angle and pulling it upward, making the protrusions 31 of the outer sleeve 30 move from the first positioning portion 231 to the second positioning portion 232 the slot 23 of the inner sleeve 20, so that the inner and outer sleeve 20, 30 are returned to their original positions, and the inner pipe 60 is locked in position and cannot be adjusted, namely, the positioning protrusions 221 of the positioning member 22 are engaged in the positioning holes 61 again.

Through the cooperation between the protrusions 31 of the outer sleeve 30 and the slot 23 of the inner sleeve 20, the position of the outer sleeve 30 relative to the inner sleeve 20 is adjusted, namely, the outer sleeve 30 is adjusted the first positioning portion 231 between the second positioning portion 232 the slot 23 of the inner sleeve 20, which allows the inner pipe 60 to be adjusted or locked after adjustment. Hence, the net post assembly in accordance with the present invention is easy to adjust and can be adjusted more stably.

Figure 10:
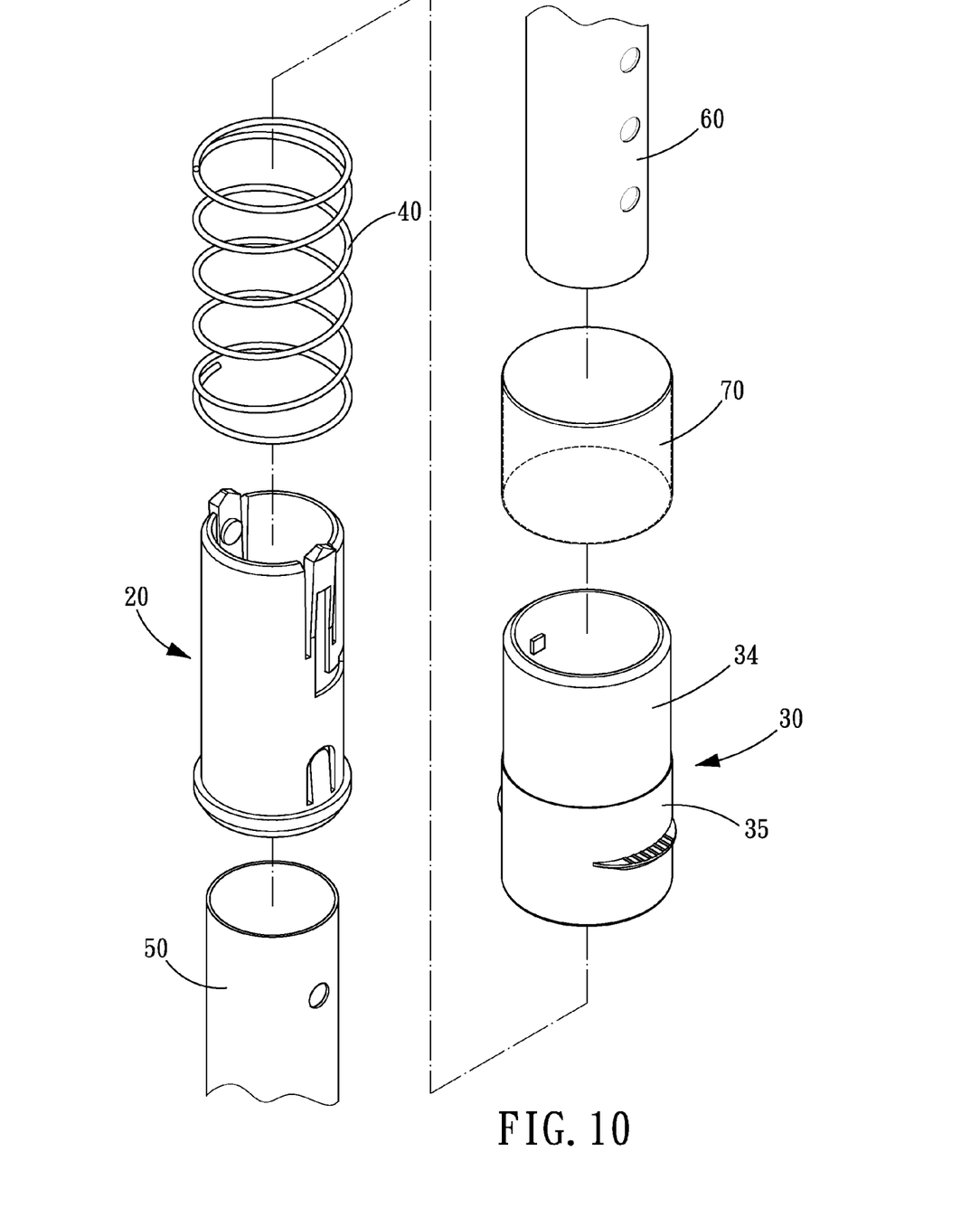
FIG. 10 is an exploded view of a net post assembly used in ball games in accordance with a second preferred embodiment of the present invention.

Referring to FIG. 10, the outer sleeve 30 of a second embodiment of the present invention can have an upper half and a lower half which are different in size, one small one big. Furthermore, a reinforced sleeve 70 made of aluminum alloy is mounted on the outer surface of the small upper half of the outer sleeve 30 to reinforce the structure strength of the outer sleeve 30.

While we have shown and described various embodiments in accordance with the present invention, it is clear to those skilled in the art that further embodiments may be made without departing from the scope of the present invention.

What is claimed is:

1. An adjustable net post assembly used in ball games comprising:
  an inner sleeve being provided with at least one gap at an upper half thereof, and an elastic positioning member extending from a bottom of the gap and being provided with a positioning protrusion on an inner surface thereof, the upper half of the inner sleeve being further formed with a slot which includes a first positioning portion at one end thereof and a second positioning portion at another end corresponding to the positioning member;
  an outer sleeve being provided with at least one protrusion on an inner surface thereof and being rotatably mounted on the inner sleeve in such a manner that the protrusion is engaged in the slot of the inner sleeve;
  a spring biased between the inner sleeve and the outer sleeve in such a manner that the protrusion of the outer sleeve is engaged in the first positioning portion or the second positioning portion the slot of the inner sleeve;
  an outer pipe with an end fixed to a lower half of the inner sleeve;
  an inner pipe being axially provided with a plurality of positioning holes and adjustably disposed in the inner sleeve and the outer pipe in such a manner that the positioning protrusion of the positioning member is selectively engaged in the positioning holes;
  when the protrusion of the outer sleeve is moved to the first positioning portion or the second positioning portion the slot of the inner sleeve by rotating the outer sleeve, the positioning protrusion of the positioning member will be disengaged from or engaged in the positioning hole of the inner pipe, so as to allow the inner pipe to be adjusted by being retracted or extended with respect to the outer pipe.

2. The adjustable net post assembly used in ball games as claimed in claim 1, wherein the protrusion is formed on the inner surface of an upper half of the outer sleeve, and a lower half of the outer sleeve is provided on its outer surface with at least one arc-shaped outward protruding gripping portion.

3. The adjustable net post assembly used in ball games as claimed in claim 2, wherein a reinforced sleeve is mounted on an outer surface of the upper half of the outer sleeve.

4. The adjustable net post assembly used in ball games as claimed in claim 3, wherein the reinforced sleeve is made of aluminum alloy.

5. The adjustable net post assembly used in ball games as claimed in claim 1, wherein the slot is an L-shaped structure including a longitudinal section and a transverse section, the first positioning portion is located in an end of the transverse section and the second positioning portion is located at atop end of the longitudinal section.

6. The adjustable net post assembly used in ball games as claimed in claim 1, wherein the lower half of the inner sleeve is formed around its outer periphery with an annular flange, on an inner surface of the outer sleeve is formed an annular shoulder portion, and the spring is biased between the annular flange of the inner sleeve and the annular shoulder portion of the outer sleeve.

7. The adjustable net post assembly used in ball games as claimed in claim 1, wherein the lower half of the inner sleeve is formed with at least one elastic positioning rib on an inner surface of which being formed a locking protrusion, and the outer pipe is provided at its end with at least one locking hole for engaging with the locking protrusion of the elastic positioning rib of the inner sleeve.

* * * * *